(12) United States Patent
Chartrand et al.

(10) Patent No.: US 12,722,580 B2
(45) Date of Patent: Sep. 1, 2026

(54) CAMERA BRACKET

(71) Applicant: NIFCO INC., Yokosuka (JP)

(72) Inventors: Pascal Makito Chartrand, Yokosuka (JP); Shinzo Watanabe, Yokosuka (JP)

(73) Assignee: NIFCO INC., Yokosuka (JP)

( * ) Notice: Subject to any disclaimer, the term of this patent is extended or adjusted under 35 U.S.C. 154(b) by 56 days.

(21) Appl. No.: 18/747,807

(22) Filed: Jun. 19, 2024

(65) Prior Publication Data

US 2025/0010805 A1 Jan. 9, 2025

(30) Foreign Application Priority Data

Jul. 3, 2023 (JP) ................................ 2023-109573

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2011/0063* (2013.01)

(58) Field of Classification Search
CPC ............. B60R 11/04; B60R 2011/0026; B60R 2011/0063
See application file for complete search history.

(56) References Cited

U.S. PATENT DOCUMENTS 10,397,452 B2 * 8/2019 Kazama ............... G01D 11/245
10,800,343 B2 * 10/2020 Kasai .................... H04N 23/54
11,678,041 B2 * 6/2023 Furutake ................ G02B 7/021 348/36
11,789,345 B2 * 10/2023 Oba ...................... F16B 5/0664 396/419
11,851,008 B2 * 12/2023 Miller ..................... B60R 11/04
12,204,231 B2 * 1/2025 Eytan .................. G03B 11/045
2015/0015713 A1 * 1/2015 Wang ...................... B60R 11/04 348/148
2016/0023620 A1 * 1/2016 Matori .................... B60R 11/04 348/148
2020/0192189 A1 * 6/2020 Kasai ...................... B60R 11/04
2023/0173997 A1 * 6/2023 Yamada .................. B60R 11/04

FOREIGN PATENT DOCUMENTS

JP 6076460 B2 2/2017

* cited by examiner

*Primary Examiner* — Derek J Battisti
(74) *Attorney, Agent, or Firm* — HAUPTMAN HAM, LLP

(57) ABSTRACT

A camera bracket made of a resin containing reinforcing fibers includes: a plate-shaped base portion disposed along a vehicle inner side face of a window panel; a lens hood portion recessed from the base portion in a direction opposite to the window panel, forming a view space between the lens hood portion and the window panel; and a lens hole formed in the base portion to communicate with the view space. A plurality of first protruding portions are provided on an inner face, which is oriented to the view space, of the lens hood portion. A plurality of second protruding portions are provided on an outer face, which is opposite to the inner face, of the lens hood portion. The lens hood portion may expand, toward a first direction to which the lens hole is oriented, in a second direction orthogonal to the first direction.

12 Claims, 6 Drawing Sheets

CAMERA BRACKET

RELATED APPLICATIONS

The present application is based on, and claims priority from, Japanese Application No. 2023-109573 filed Jul. 3, 2023, the disclosure of which is hereby incorporated by reference herein in its entirety.

FIELD

The present invention relates to a camera bracket for fixing a vehicle-mounted camera to a window panel.

BACKGROUND

Patent Literature 1 discloses a camera unit to be provided on a vehicle inner side face of a windshield of a vehicle. The camera unit includes a camera body and a camera bracket (camera case) that supports the camera body. The camera bracket includes a lens hood portion that forms a view space in front of the camera body. The lens hood portion is provided with a reflected wave-reducing structure, which is for preventing stray light, at an inner face. The reflected wave-reducing structure is formed by a plurality of protruding portions.

CITATION LIST

Patent Literature

[Patent Literature 1] Japanese Patent No. 6076460

SUMMARY

Technical Problem

To defog a windshield facing a view space, there is a case in which a heater is provided at a camera bracket. In such a case, to improve heat resistance of a bracket made of a resin, there is a desire to form the bracket with a fiber-reinforced resin. However, forming a lens hood portion having an unevenness by injection molding of the fiber-reinforced resin leads to a problem of a warp of the lens hood portion.

In view of the above background, an object of the present invention is to prevent deformation during molding of a camera bracket made of a resin containing reinforcing fibers.

Solution to Problem

To achieve such an object, one aspect of the present invention provides a camera bracket (4) made of a resin containing reinforcing fibers, the camera bracket including: a plate-shaped base portion (11) disposed along a vehicle inner side face of a window panel (1); a lens hood portion (13) recessed from the base portion in a direction opposite to the window panel, forming a view space (12) between the lens hood portion and the window panel; and a lens hole (14) formed in the base portion and in communication with the view space, in which a plurality of first protruding portions (51) are provided on an inner face, which is oriented to the view space, of the lens hood portion, and a plurality of second protruding portions (52) are provided on an outer face, which is opposite to the inner face, of the lens hood portion.

According to this aspect, deformation during molding can be prevented in a camera bracket made of a resin containing reinforcing fibers. In injection molding of a resin containing reinforcing fibers, if a surface of a molded product is uneven, the resin is undulated in the uneven portions, resulting in irregularly oriented reinforcing fibers. In contrast, if the surface of the molded product is smooth, the resin flows in one direction and the reinforcing fibers are aligned unidirectionally. In this manner, a different structure between the front and back surfaces of the molded product leads to a difference in the orientation of the reinforcing fibers. Consequently, since a resin is difficult to shrink in a longitudinal direction of the reinforcing fibers, a difference in the amount of shrinkage between the front and back surfaces of the molded product generates, and the molded product is deformed. In the above aspect, the first protruding portions are formed on the inner face and the second protruding portions are formed on the outer face of the lens hood portion, whereby difference is less likely to be caused in the orientation of the reinforcing fibers on the inner and outer faces. This prevents deformation during molding of the camera bracket.

In the above aspect, the lens hood portion may expand, toward a first direction to which the lens hole is oriented, in a second direction orthogonal to the first direction, and the first protruding portions and the second protruding portions may extend in the second direction.

According to this aspect, the inner and outer faces of the lens hood have similar shapes, whereby difference is less likely to be caused in the orientation of the reinforcing fibers on the inner and outer faces. This prevents deformation during molding of the camera bracket.

In the above aspect, each of the first protruding portions may have a triangular cross section when viewed from the second direction, and may include a first inclined surface (51A) provided at a side of the lens hole, and a second inclined surface (51B) provided at a side opposite to the lens hole, and in the first direction, the first inclined surface may be shorter than the second inclined surface.

According to this aspect, the first protruding portions reflect stray light to the outside, which makes it difficult for the stray light to reach the lens.

In the above aspect, each of the second protruding portions may have a triangular cross section when viewed from the second direction, and may include a third inclined surface (52A) provided at the side of the lens hole, and a fourth inclined surface (52B) provided at the side opposite to the lens hole, and in the first direction, the fourth inclined surface may be shorter than the third inclined surface.

According to this aspect, the inner and outer faces of the lens hood have similar shapes, whereby difference is less likely to be caused in the orientation of the reinforcing fibers on the inner and outer faces. This prevents deformation during molding of the camera bracket.

In the above aspect, each of the third inclined surfaces may be formed in parallel to the closest second inclined surface, and each of the fourth inclined surfaces may be formed in parallel to the closest first inclined surface.

According to this aspect, the inner and outer faces of the lens hood have similar shapes, whereby difference is less likely to be caused in the orientation of the reinforcing fibers on the inner and outer faces. This prevents deformation during molding of the camera bracket.

In the above aspect, a first recessed portion (55) may be formed between any two of the first protruding portions adjacent to each other, a second recessed portion (56) may be formed between any two of the second protruding portions adjacent to each other, and a first imaginary line (57) connecting respective bottoms of the first recessed portions and a second imaginary line (58) connecting respective bottoms of the second recessed portions may be separated from each other in a thickness direction of the lens hood portion.

According to this aspect, a plate-shaped intermediate layer having a predetermined thickness is formed between the first protruding portions and the second protruding portions, which improves the rigidity of the lens hood portion. This prevents deformation during molding of the camera bracket.

In the above aspect, the reinforcing fibers may be glass fibers.

According to this aspect, the heat resistance of the camera bracket can be improved.

In the above aspect, the base portion may adhere to the window panel.

According to this aspect, the camera bracket is less deformed during molding, which improves adhesion between the camera bracket and the window panel.

Advantageous Effects of Invention

According to the above configuration, deformation during molding can be prevented in a camera bracket made of a resin containing reinforcing fibers.

DESCRIPTION OF EMBODIMENTS

An embodiment of a camera bracket of the present invention will now be described below. The camera bracket forms a part of a vehicle-mounted camera unit provided at a vehicle compartment side of a window panel of a vehicle. The window panel includes a front window panel defining a front portion of a vehicle compartment, a rear window panel defining a rear portion of the vehicle compartment, and a pair of side window panels defining the left and right sides of the vehicle compartment.

In the present embodiment, a window panel 1 is a front windshield. The window panel 1 is inclined upwardly toward a rear direction (see FIG. 6). A vehicle-mounted camera unit 2 is provided at an upper end portion of a vehicle inner side face of the window panel 1.

Figure 1:
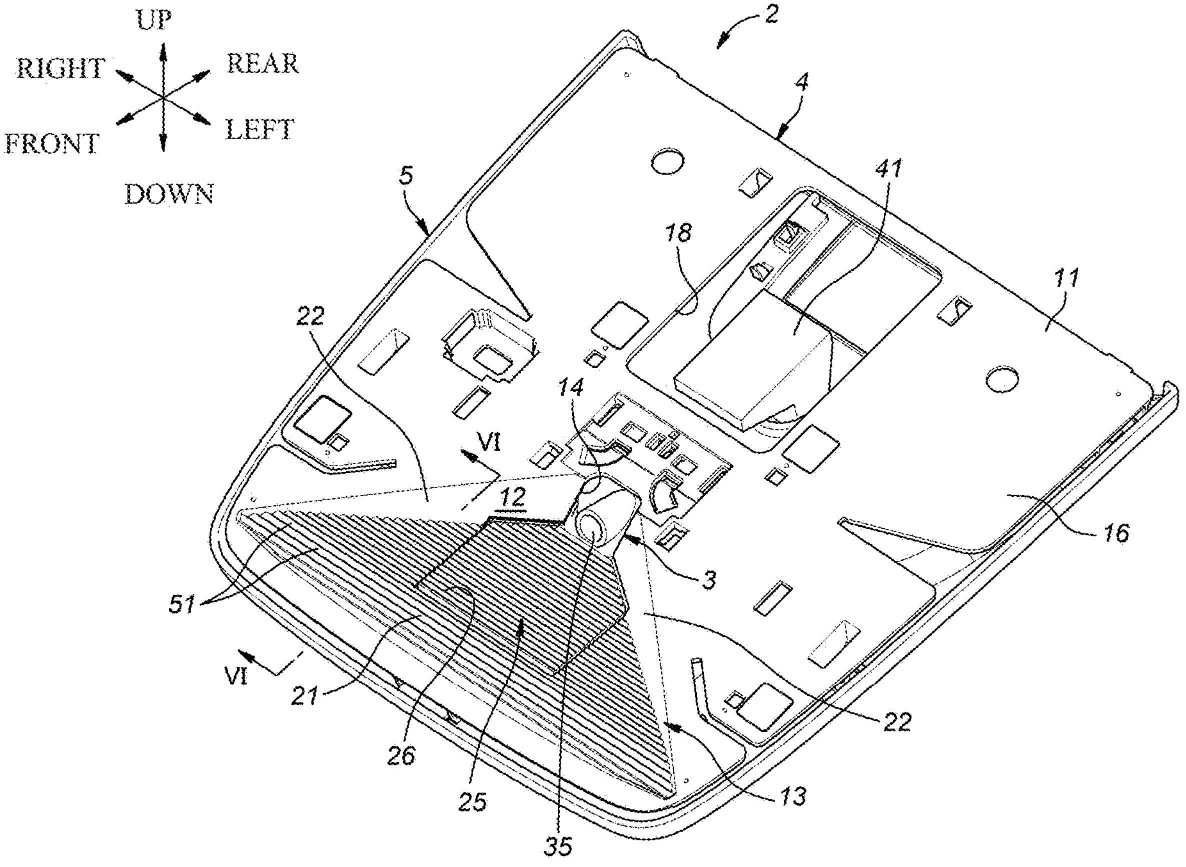
FIG. 1 is a perspective view of a vehicle-mounted camera unit according to an embodiment viewed from the outside of a vehicle.
Figure 2:
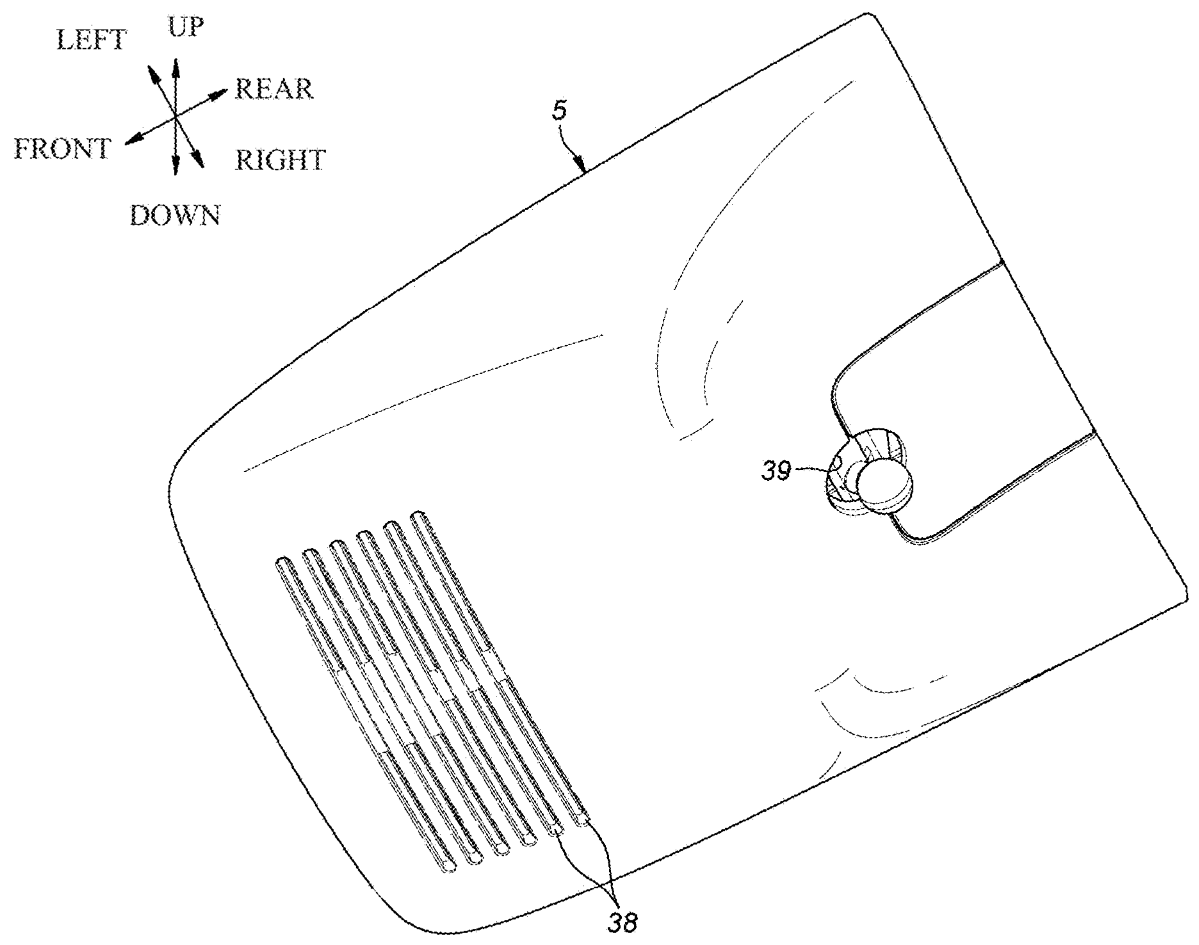
FIG. 2 is a perspective view of the vehicle-mounted camera unit according to the embodiment viewed from the inside of the vehicle.

As illustrated in FIGS. 1 and 2, the vehicle-mounted camera unit 2 includes a camera body 3, a camera bracket 4 mounted on the vehicle inner side face of the window panel 1 and supporting the camera body 3, and a cover 5 disposed below the camera body 3 and the camera bracket 4.

The camera bracket 4 is made of a resin containing reinforcing fibers. The reinforcing fibers improve the heat resistance and rigidity of the camera bracket 4. The reinforcing fibers may be glass fibers, carbon fibers, aramid fibers, and the like. The resin as a base material may be polybutylene terephthalate (PBT), a styrene-acrylonitrile copolymer (SAN), or a mixture of these materials. The camera bracket 4 is molded by injection molding of a resin in which finely cut reinforcing fibers are uniformly mixed.

Figure 3:
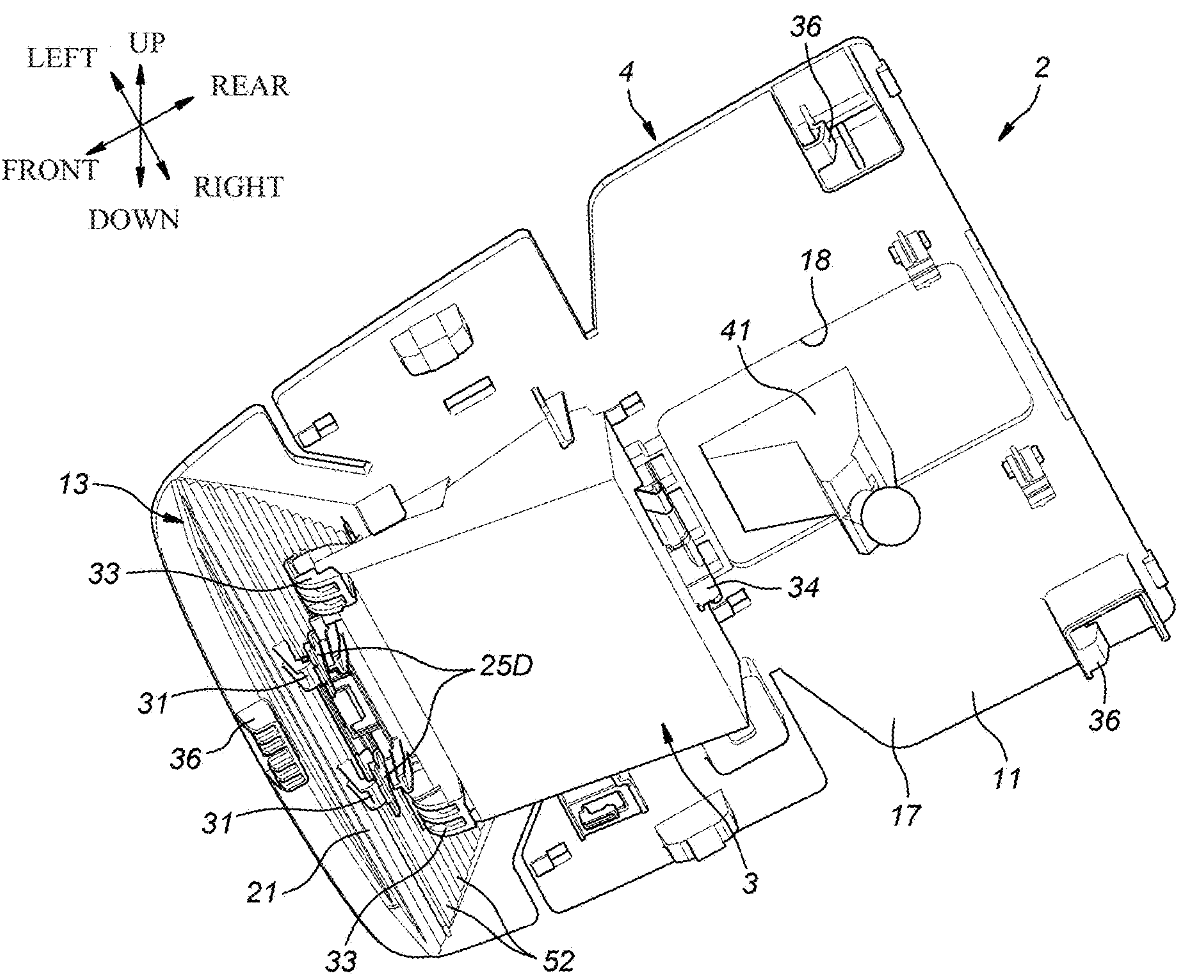
FIG. 3 is a perspective view of the vehicle-mounted camera unit omitting a cover viewed from the inside of the vehicle.
Figure 4:
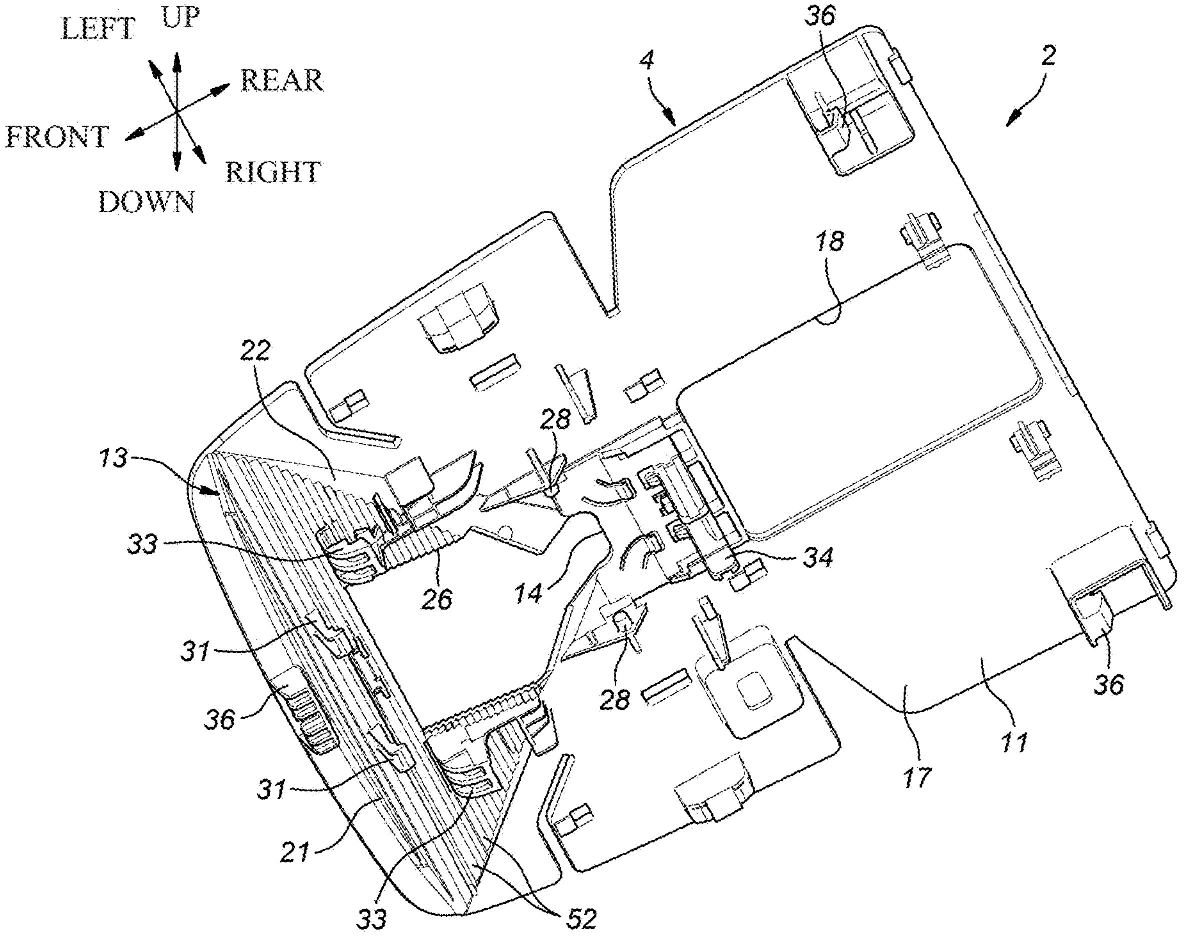
FIG. 4 is a perspective view of a camera bracket omitting a lid viewed from the inside of the vehicle.

As illustrated in FIGS. 3 and 4, the camera bracket 4 includes: a plate-shaped base portion 11 disposed along the vehicle inner side face of the window panel 1; a lens hood portion 13 recessed from the base portion 11 in a direction opposite to the window panel 1, forming a view space 12 between the lens hood portion 13 and the window panel 1; and a lens hole 14 formed in the base portion 11 and in communication with the view space 12. The base portion 11 is formed in a flat shape and includes a front face 16 along the vehicle inner side face of the window panel 1 and a rear face 17 opposite to the front face 16. At a rear portion of the base portion 11, a first mirror-attachment hole 18 penetrating in a thickness direction is formed.

The lens hood portion 13 is provided at a front portion of the base portion 11. The lens hood portion 13 is recessed with respect to the front face 16 and protrudes with respect to the rear face 17. That is, the lens hood portion 13 swells from the base portion 11 to the vehicle compartment side. The lens hood portion 13 includes a bottom wall portion 21 and left and right side wall portions 22. The bottom wall portion 21 and the left and right side wall portions 22 are each formed in a plate shape. The bottom wall portion 21 includes a front edge extending in a left-right direction and left and right side edges inclined inward from left and right toward the rear direction, which forms an isosceles triangle shape when viewed from above. The bottom wall portion 21 is connected to the base portion 11 at the front edge, and inclined downward with respect to the base portion 11. That is, a rear end of the bottom wall portion 21 is disposed downward with respect to the base portion 11. The left and right side wall portions 22 extend in an up-down direction and connect the left and right side edges of the bottom wall portion 21 with the base portion 11.

The lens hole 14 is defined by the rear end of the bottom wall portion 21, rear ends of the left and right side wall portions 22, and the base portion 11. The lens hole 14 penetrates the camera bracket 4 in a thickness direction. The lens hole 14 opens toward a first direction. In the present embodiment, the first direction is a front direction. The lens hood portion 13 expands, toward the first direction to which the lens hole 14 is oriented, in a second direction orthogonal to the first direction. In the present embodiment, the lens hood portion 13 expands in the left-right direction toward the front direction.

Figure 5:
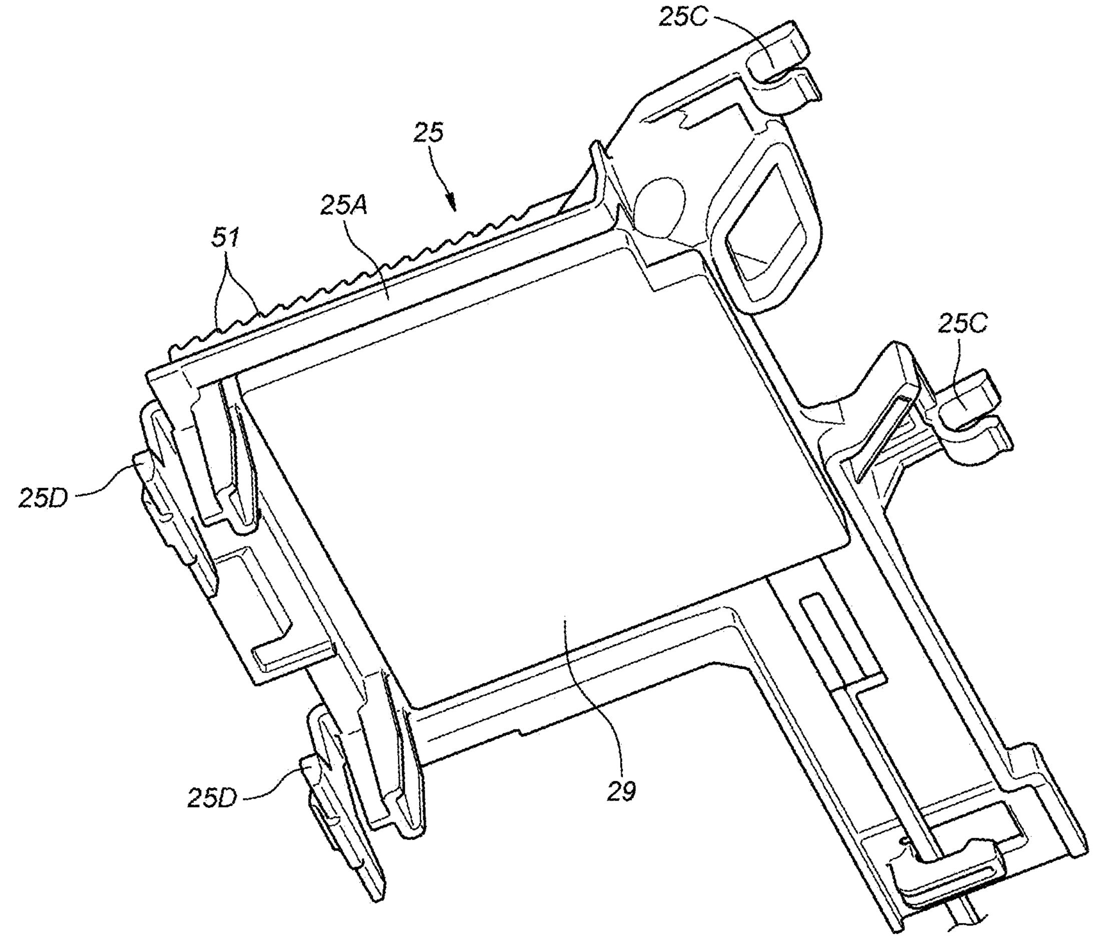
FIG. 5 is a perspective view of the lid viewed from the inside of the vehicle.

As illustrated in FIG. 1, a rear portion of the bottom wall portion 21 is formed by an attachable and detachable lid 25. As illustrated in FIGS. 1 and 4, a work hole 26, which is a through hole, is formed in the rear portion of the bottom wall portion 21. As illustrated in FIGS. 1 and 5, the lid 25 includes a plate-shaped body 25A for closing the work hole 26. The lid 25 is pivotably supported by the base portion 11. As illustrated in FIG. 4, the base portion 11 is provided with a pair of left and right support shafts 28, which extend in the left-right direction, on a lower face. As illustrated in FIG. 5, a rear portion of the body 25A of the lid 25 is provided with bearings 25C for receiving the respective support shafts 28. The lid 25 pivots between a closed position, which closes the work hole 26, and an open position, which opens the work hole 26. When the lid 25 is in the closed position, the lid 25 forms a part of the bottom wall portion 21. As illustrated in FIG. 4, the base portion 11 is provided with a pair of left and right engagement claws 31 on the lower face. As illustrated in FIG. 5, a front portion of the body 25A of the lid 25 is provided with a pair of left and right elastic claws 25D. Each elastic claw 25D is engaged in the corresponding engagement claw 31, whereby the lid 25 is held in the closed position.

A plate-shaped heater 29 is provided on an outer face of the lid 25 oriented to the vehicle inner side. The heater 29 is a heater that generates heat upon supply of electric power. The heater 29 may be a PTC heater or an electrically heating wire.

As illustrated in FIG. 4, a pair of left and right front engagement portions 33 and a rear engagement portion 34 for supporting the camera body 3 are provided on the rear face 17 of the camera bracket 4. Each front engagement portion 33 protrudes downward from a lower face of the bottom wall portion 21. The respective front engagement portions 33 are disposed at left and right sides of the work hole 26. Each front engagement portion 33 has an attached engagement claw having elasticity, and engages a front end of the camera body 3 through the engagement claw. The rear engagement portion 34 protrudes downward from the lower face of the base portion 11. The rear engagement portion 34 is disposed behind the work hole 26. The rear engagement portion 34 has an attached engagement claw, and engages a rear end of the camera body 3 through the engagement claw. The camera body 3 is engaged in the left and right front engagement portions 33 and the rear engagement portion 34, whereby the camera body 3 is supported by the camera bracket 4. In a state where the camera body 3 is supported by the camera bracket 4, a lens 35 of the camera body 3 is disposed at the lens hole 14 and oriented to the front direction through the lens hole 14.

A plurality of cover engagement portions 36 are provided on a lower face of the camera bracket 4. The cover 5 is engaged in the cover engagement portions 36 and is disposed below the camera bracket 4. The cover 5 covers below the camera bracket 4 and the camera body 3. As illustrated in FIG. 2, a plurality of air through holes 38 and a second mirror-attachment hole 39 are formed at the cover 5.

As illustrated in FIGS. 1 and 2, a mirror stay 41 for mounting a windshield rearview mirror is adhered to the window panel 1, extends downward through the first mirror-attachment hole 18 and the second mirror-attachment hole 39, and protrudes below the cover 5. The windshield rear-view mirror is coupled to a lower end of the mirror stay 41.

Figure 6:
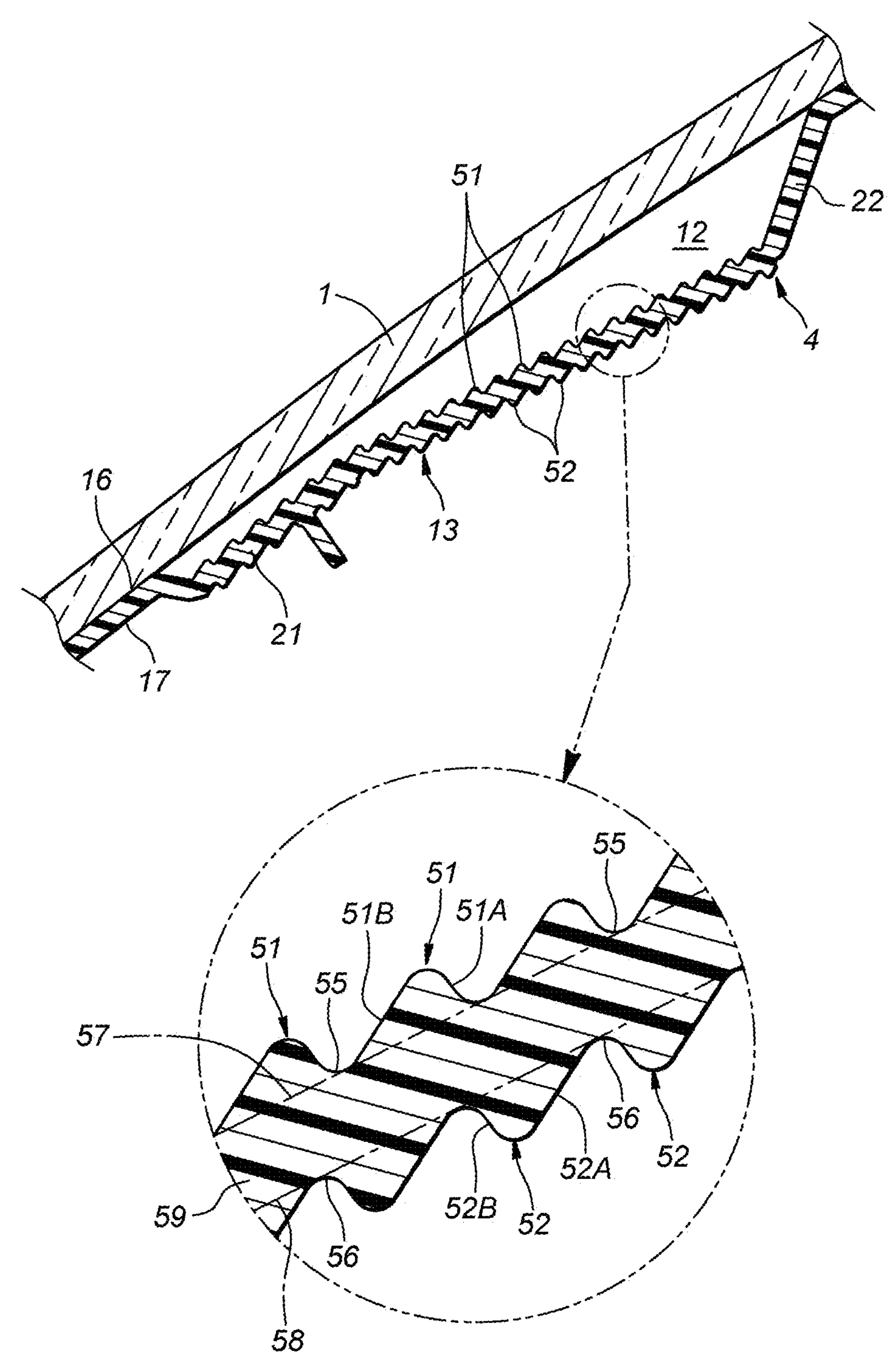
FIG. 6 is a sectional view of the camera bracket (along line VI-VI in FIG. 1).

A structure of the camera bracket 4 will be described in detail below. As illustrated in FIGS. 1 and 6, a plurality of first protruding portions 51 are provided on an inner face of the lens hood portion 13 oriented to the view space 12. As illustrated in FIGS. 4 and 6, a plurality of second protruding portions 52 are provided on the outer face, opposite to the inner face, of the lens hood portion 13. The first protruding portions 51 function as a reflected wave-reducing structure for preventing stray light. That is, the first protruding portions 51 reflect stray light to the outside of the vehicle, preventing stray light from reaching the lens 35. The second protruding portions 52 function to prevent deformation of the camera bracket 4 during molding.

As illustrated in FIG. 1, the first protruding portions 51 are provided on an inner face of the bottom wall portion 21 oriented to the view space 12, and the second protruding portions 52 are provided on an outer face of the bottom wall portion 21 oriented to the vehicle compartment side. The first protruding portions 51 are also provided on an inner face of the body 25A of the lid 25. The second protruding portions 52 are not provided on the outer face of the lid 25. In other embodiments, the second protruding portions 52 may also be provided on the outer face of the lid 25.

As illustrated in FIGS. 1 and 4, the first protruding portions 51 and the second protruding portions 52 extend in the left-right direction (second direction). As illustrated in FIG. 6, each of the first protruding portions 51 has a triangular cross section when viewed from the left-right direction, and includes a first inclined surface 51A provided on the side of the lens hole 14, and a second inclined surface 51B provided on the side opposite to the lens hole 14. In the front-rear direction, the first inclined surface 51A is shorter than the second inclined surface 51B. Each of the second protruding portions 52 has a triangular cross section when viewed from the left-right direction, and includes a third inclined surface 52A provided on the side of the lens hole 14, and a fourth inclined surface 52B provided on the side opposite to the lens hole 14. In the first direction, the fourth inclined surface 52B is shorter than the third inclined surface 52A.

Each first protruding portion 51 may have the same cross-sectional shape as each other. Each second protruding portion 52 may have the same cross-sectional shape as each other. In addition, each first protruding portion 51 and each second protruding portion 52 may have the same cross-sectional shape as each other.

Each of the third inclined surfaces 52A may be formed in parallel to the closest second inclined surface 51B. Each of the fourth inclined surfaces 52B may be formed in parallel to the closest first inclined surface 51A.

A first recessed portion 55 is formed between any two of the first protruding portions 51 adjacent to each other. A second recessed portion 56 is formed between any two of the second protruding portions 52 adjacent to each other. A first imaginary line 57 connecting respective bottoms of the first recessed portions 55 and a second imaginary line 58 connecting respective bottoms of the second recessed portions 56 are separated from each other in a thickness direction of the lens hood portion 13. That is, the bottom wall portion 21 includes a plate-shaped intermediate layer 59 defined by the first imaginary line 57 and the second imaginary line 58. The first protruding portions 51 and the second protruding portions 52 protrude outward from the surfaces of the intermediate layer 59.

Effects of the camera bracket 4 according to the embodiment will be described. In the camera bracket 4 made of a resin containing reinforcing fibers, the second protruding portions 52 are provided on the outer face of the bottom wall portion 21, thereby preventing deformation during molding. In injection molding of a resin containing reinforcing fibers, if a surface of a molded product is uneven, the resin is undulated in the uneven portions, resulting in irregularly oriented reinforcing fibers. In contrast, if the surface of the molded product is smooth, the resin flows in one direction and the reinforcing fibers are aligned unidirectionally. In this manner, a different structure between the front and back surfaces of the molded product leads to a difference in the orientation of the reinforcing fibers. Consequently, since a resin is difficult to shrink in a longitudinal direction of the reinforcing fibers, a difference in the amount of shrinkage between the front and back surfaces of the molded product generates, and the molded product is deformed. In the above aspect, the first protruding portions 51 are formed on the inner face and the second protruding portions 52 are formed on the outer face of the bottom wall portion 21 of the lens hood portion 13, whereby difference is less likely to be caused in the orientation of the reinforcing fibers on the inner and outer faces during injection molding. This prevents deformation during molding of the camera bracket 4.

The first protruding portions 51 and the second protruding portions 52 have the same shape as each other, and thus the inner and outer faces of the bottom wall portion 21 have similar shapes, whereby difference is less likely to be caused in the orientation of the reinforcing fibers on the inner and outer faces. This prevents deformation during molding of the camera bracket 4.

The plate-shaped intermediate layer 59 defined by the first imaginary line 57 and the second imaginary line 58 is formed between the first protruding portions 51 and the second protruding portions 52, thereby improving the rigidity of the lens hood portion 13. This prevents deformation during molding of the camera bracket 4. In addition, the resin can flow smoothly through the intermediate layer 59 during injection molding.

During injection molding, an inlet of the resin is provided at a front or rear end of the camera bracket 4. The resin may flow in the front-rear direction from the inlet. The first protruding portions 51 and the second protruding portions 52 extend in a direction orthogonal to the direction of resin flow. The resin flow is thus disturbed at the first protruding portions 51 and the second protruding portions 52, whereby the orientation of the reinforcing fibers is dispersed.

The lid 25 is relatively small, which leads to less deformation during injection molding even if the second protruding portions 52 are omitted. The second protruding portions 52 may be formed on a rear face of the body 25A of the lid 25.

While the specific embodiment has been described above, the present invention is not limited to the above embodiment and can be modified widely. For example, the work hole 26 and the lid 25 may be omitted from the camera bracket 4. In this case, the bottom wall portion 21 may be formed of a single continuous member. In correspondence with the first protruding portions 51, the second protruding portions 52 may be arranged over the entire rear face of the bottom wall portion 21.

Various shapes can be applied to the first protruding portions 51. For example, each first protruding portion 51 may have a shape such as a hemisphere, a cylinder, a square column, a cone, a triangular pyramid, a square pyramid, and the like, and may be arranged in a distributed manner or densely on the bottom wall portion 21. The second protruding portions 52 may be formed in the same shape as, or a shape approximated to, the first protruding portions 51.

REFERENCE SIGNS LIST

1 Window panel
2 Vehicle-mounted camera unit
3 Camera body
4 Camera bracket
5 Cover
11 Base portion
12 View space
13 Lens hood portion
14 Lens hole
35 Lens
51 First protruding portion
51A First inclined surface
51B Second inclined surface
52 Second protruding portion
52A Third inclined surface
52B Fourth inclined surface
55 First recessed portion
56 Second recessed portion
57 First imaginary line
58 Second imaginary line
59 Intermediate layer

The invention claimed is:

1. A camera bracket made of a resin containing reinforcing fibers, the camera bracket comprising: a plate-shaped base portion disposed along a vehicle inner side face of a window panel; a lens hood portion recessed from the base portion in a direction opposite to the window panel, forming a view space between the lens hood portion and the window panel; and a lens hole formed in the base portion and in communication with the view space, wherein a plurality of first protruding portions is provided on an inner face, which is oriented to the view space, of the lens hood portion, and a plurality of second protruding portions are provided on an outer face, which is opposite to the inner face, of the lens hood portion, wherein the inner face and the outer face of the lens hood portion are parallel with each other, and the plurality of second protruding portions protrudes in a direction which is opposite direction in which the plurality of first protruding portions protrudes, wherein the plurality of second protruding portions is provided on the outer face, which is opposite side to the inner face, of the same lens hood portion on which the first plurality of protruding portions is provided.

2. The camera bracket according to claim 1, wherein
the lens hood portion expands, toward a first direction to which the lens hole is oriented, in a second direction orthogonal to the first direction, and
the first protruding portions and the second protruding portions extend in the second direction.

3. The camera bracket according to claim 2, wherein
each of the first protruding portions has a triangular cross section when viewed from the second direction, and includes a first inclined surface provided at a side of the lens hole, and a second inclined surface provided at a side opposite to the lens hole, and
in the first direction, the first inclined surface is shorter than the second inclined surface.

4. The camera bracket according to claim 3, wherein
each of the second protruding portions has a triangular cross section when viewed from the second direction, and includes a third inclined surface provided at the side of the lens hole, and a fourth inclined surface provided at the side opposite to the lens hole, and
in the first direction, the fourth inclined surface is shorter than the third inclined surface.

5. The camera bracket according to claim 4, wherein
each of the third inclined surfaces is formed in parallel to the closest second inclined surface, and
each of the fourth inclined surfaces is formed in parallel to the closest first inclined surface.

6. The camera bracket according to claim 1, wherein
a first recessed portion is formed between any two of the first protruding portions adjacent to each other,
a second recessed portion is formed between any two of the second protruding portions adjacent to each other, and
a first imaginary line connecting respective bottoms of the first recessed portions and a second imaginary line connecting respective bottoms of the second recessed portions are separated from each other in a thickness direction of the lens hood portion.

7. The camera bracket according to claim 1, wherein the reinforcing fibers are glass fibers.

8. The camera bracket according to claim 1, wherein the base portion is adhered to the window panel.

9. The camera bracket according to claim 1, wherein each of the plurality of first protruding portions and each of the plurality of second protruding portions has a same cross-sectional shape as each other.

10. The camera bracket according to claim 1, wherein the lens hood portion has a width enlarging toward a first direction to which the lens hole is oriented, in a second direction orthogonal to the first direction, and the plurality of first protruding portions and the plurality of second protruding portions extend in the second direction, each of the plurality of first protruding portions has a triangular cross section when viewed from the second direction, and includes a first inclined surface provided at a side of the lens hole, and a second inclined surface provided at a side opposite to the lens hole, and in the first direction, a length of the first inclined surface is different from a length of the second inclined surface.

11. The camera bracket according to claim 1, wherein the length of the first inclined surface is shorter than the length of the second inclined surface.

12. The camera bracket according to claim 10, wherein each of the plurality of second protruding portions has a triangular cross section when viewed from the second direction, and includes a third inclined surface provided at a side of the lens hole, and a fourth inclined surface provided at a side opposite to the lens hole, and in the first direction, a length of the third inclined surface is different from a length of the fourth inclined surface.

* * * * *